(12) United States Patent
Mori

(10) Patent No.: US 8,284,460 B2
(45) Date of Patent: Oct. 9, 2012

(54) IMAGE PROCESSING APPARATUS DIRECTED TO IMAGE OUTLINE PROCESSING, IMAGE PROCESSING METHOD OF THE SAME, AND COMPUTER-READABLE STORAGE MEDIUM STORING INSTRUCTIONS FOR PERFORMING IMAGE PROCESSING

(75) Inventor: Toshihiro Mori, Neyagawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 540 days.

(21) Appl. No.: 12/545,910

(22) Filed: Aug. 24, 2009

(65) Prior Publication Data

US 2010/0053707 A1 Mar. 4, 2010

(30) Foreign Application Priority Data

Aug. 29, 2008 (JP) ................................. 2008-221273

(51) Int. Cl.
*H04N 1/04* (2006.01)
(52) U.S. Cl. ......... 358/474; 358/505; 358/1.9; 358/449; 382/298; 382/176; 348/607
(58) Field of Classification Search .................. 358/505, 358/462, 538, 449, 474; 382/298, 176, 232, 382/199, 253, 321, 305; 348/607, E05.007
See application file for complete search history.

(56) References Cited

U.S. PATENT DOCUMENTS

| 5,719,955 | A | * | 2/1998 | Mita | 382/158 |
| 5,757,961 | A | | 5/1998 | Yamakawa et al. | |
| 5,768,438 | A | * | 6/1998 | Etoh | 382/251 |
| 6,944,319 | B1 | * | 9/2005 | Huang et al. | 382/118 |
| 7,072,527 | B1 | * | 7/2006 | Nako | 382/290 |
| 7,127,087 | B2 | * | 10/2006 | Huang et al. | 382/118 |
| 7,142,697 | B2 | * | 11/2006 | Huang et al. | 382/118 |
| 7,391,917 | B2 | | 6/2008 | Ohta et al. | |

(Continued)

FOREIGN PATENT DOCUMENTS

JP 03-066280 3/1991

(Continued)

OTHER PUBLICATIONS

Notice of Grounds of Rejection dated Jun. 15, 2010, issued in the corresponding Japanese Patent Application No. 2008-221273, and an English Translation thereof.

*Primary Examiner* — Negussie Worku
(74) *Attorney, Agent, or Firm* — Buchanan Ingersoll & Rooney PC

(57) ABSTRACT

In outline processing according to the present embodiment, a normalization coefficient is determined such that values outputted as outline data substantially coincide with a maximum value in a prescribed number of digits in accordance with a variation amount between coordinate values. Such determination can constantly enhance image quality (legibility of a character) of the outline data up to a highest value under conditions of the prescribed number of digits as well as being free of the influence of a size of a target character. In other words, it is possible to provide the highest feasible image quality under the limitation of the number of digits set from the limit of a file size.

15 Claims, 8 Drawing Sheets

U.S. PATENT DOCUMENTS

| | | | |
|---|---|---|---|
| 7,561,747 B2 * | 7/2009 | Tse et al. | 382/232 |
| 7,664,326 B2 * | 2/2010 | Tamura | 382/199 |
| 7,903,880 B2 * | 3/2011 | Wyatt et al. | 382/199 |
| 8,045,874 B2 * | 10/2011 | Yoshida et al. | 399/49 |
| 8,073,274 B2 * | 12/2011 | Hiraizumi et al. | 382/239 |
| 8,081,839 B2 * | 12/2011 | Hasegawa | 382/274 |
| 2006/0023933 A1 * | 2/2006 | Mitsui | 382/145 |
| 2007/0086667 A1 * | 4/2007 | Dai et al. | 382/242 |
| 2008/0019594 A1 * | 1/2008 | Hiraizumi et al. | 382/190 |
| 2008/0240588 A1 * | 10/2008 | Tsoupko-Sitnikov et al. | 382/236 |
| 2011/0228167 A1 * | 9/2011 | Sasaki | 348/607 |

FOREIGN PATENT DOCUMENTS

| | | |
|---|---|---|
| JP | 05-342340 | 12/1993 |
| JP | 2004-326490 | 11/2004 |
| JP | 2005-174227 A | 6/2005 |
| JP | 2006-048180 | 2/2006 |
| JP | 2006-253892 A | 9/2006 |

* cited by examiner

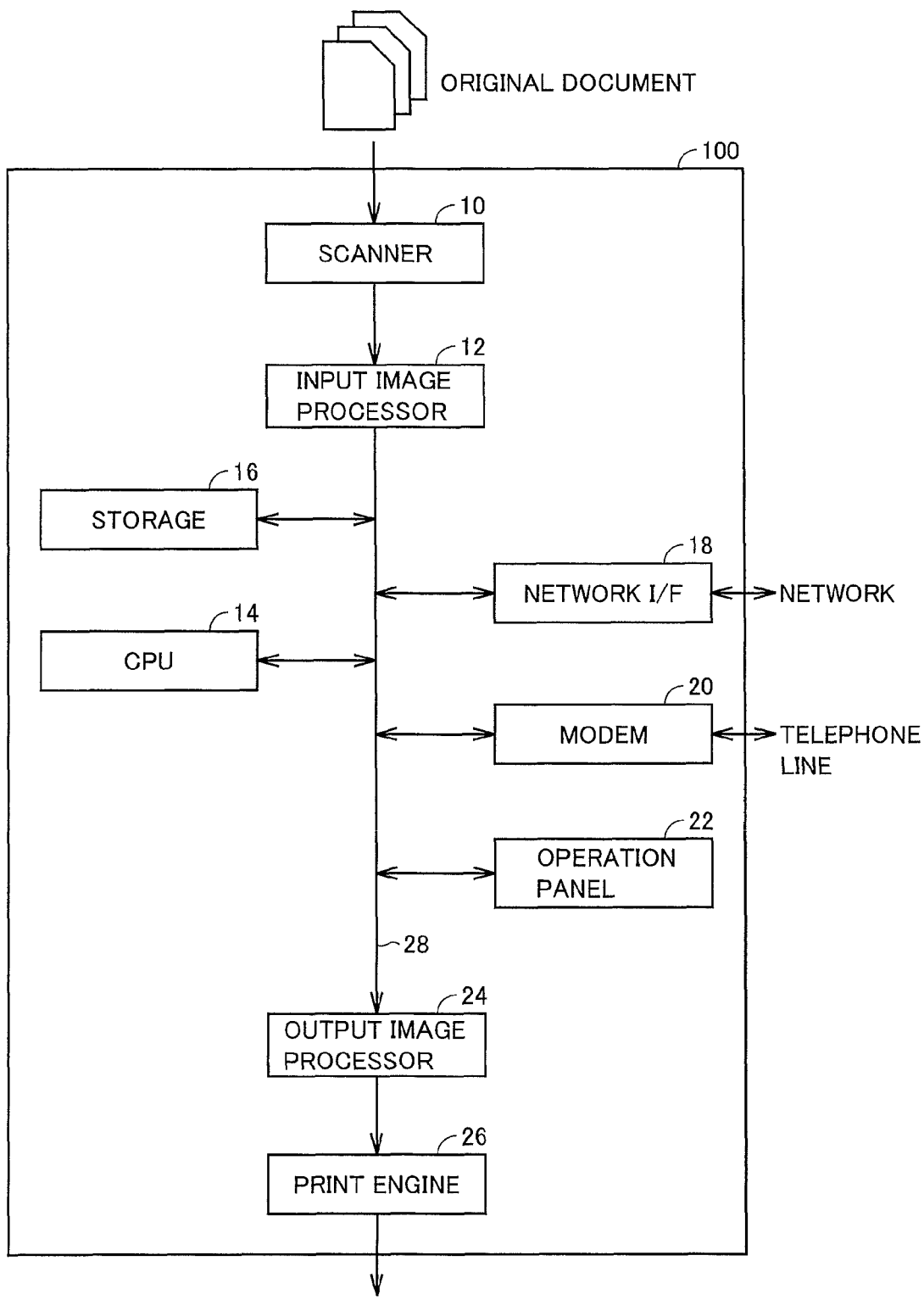

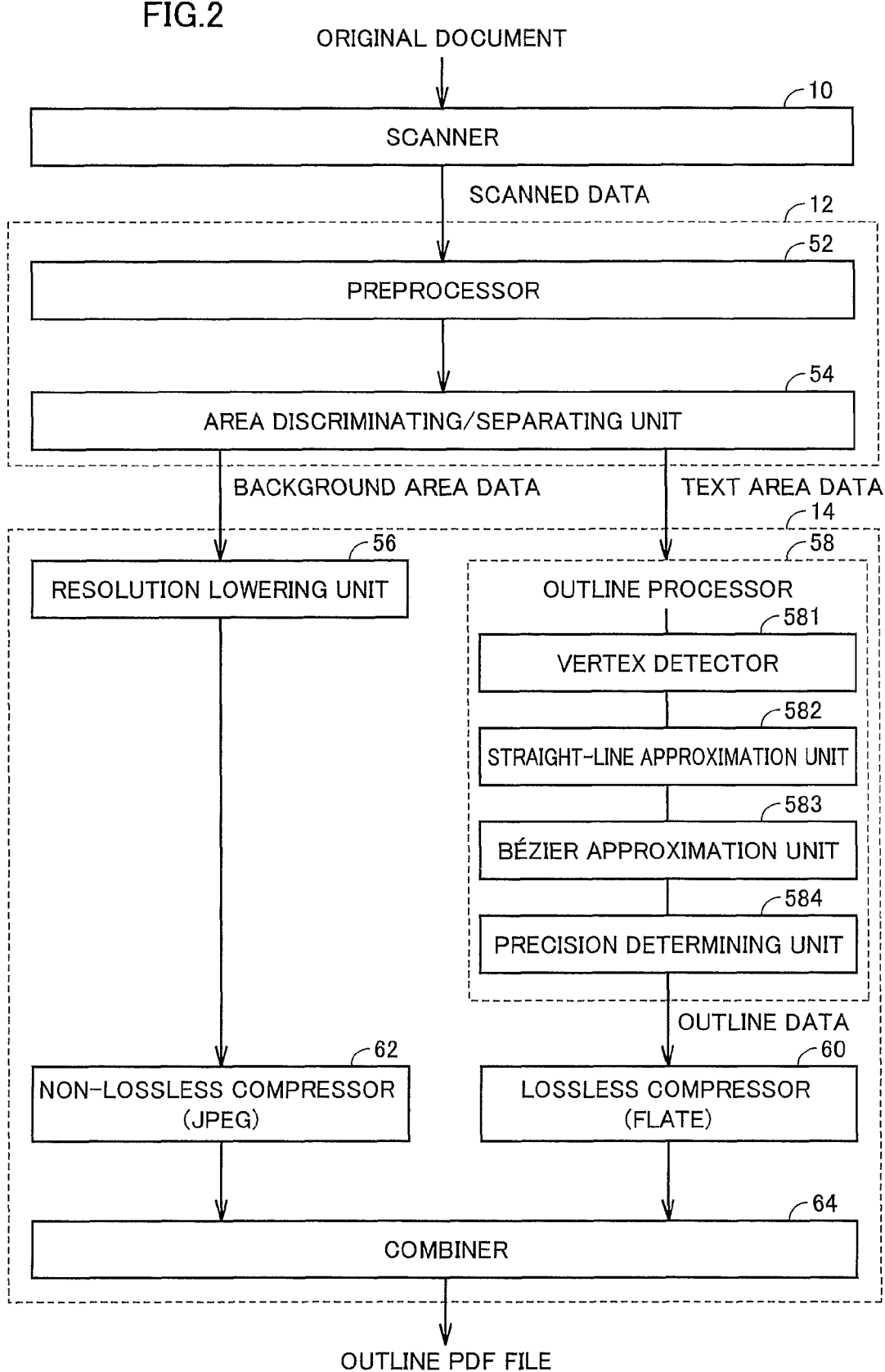

| COORDINATE VALUE |
|---|
| A (30.00 ,10.00) |
| B (32.51 ,10.00) |
| C (32.51 ,12.53) |
| D (33.82 ,12.53) |
| E (33.82 ,13.94) |
| F (30.00 ,13.94) |

| COORDINATE VALUE |
|---|
| A (0 ,0) |
| B (2.51 ,0) |
| C (2.51 ,2.53) |
| D (3.82 ,2.53) |
| E (3.82 ,3.94) |
| F (0.00 ,3.94) |

| COORDINATE VALUE |
|---|
| A (0 ,0) |
| B (63 ,0) |
| C (63 ,63) |
| D (96 ,63) |
| E (96 ,99) |
| F (0 ,99) |

FIG.6
```
         q
202 ── 0.04 0.04 cm
204 ── 30 10 cm
211 ── 0 0 l
212 ── 63 0 l
213 ── 63 63 l
214 ── 96 63 l
215 ── 96 99 l
216 ── 0 99 l
217 ── 0 0 l
         Q
```
FIG.7A
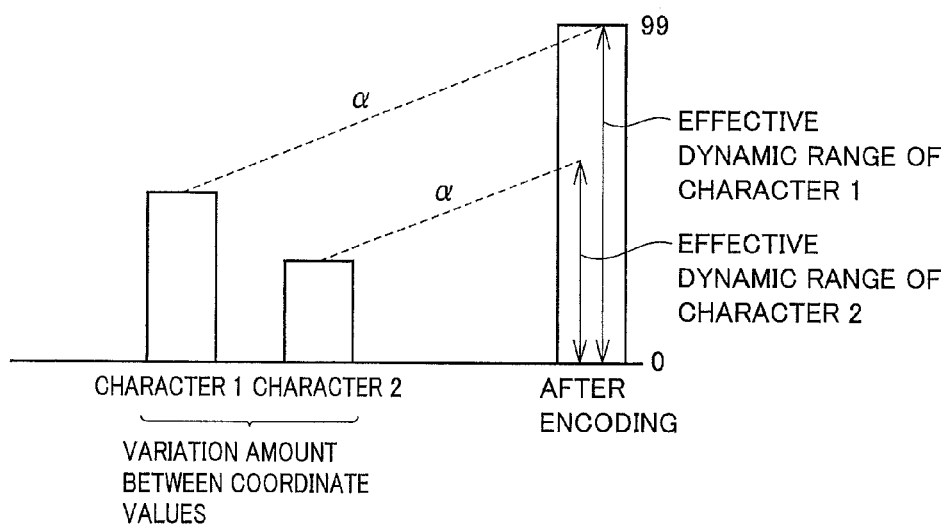
FIG.7B
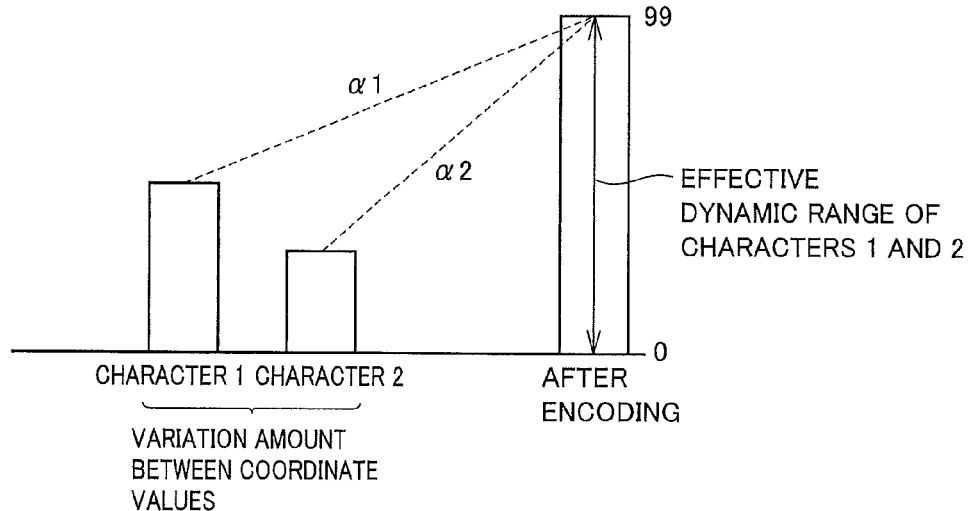

FIG.8A
AVERAGE ERROR
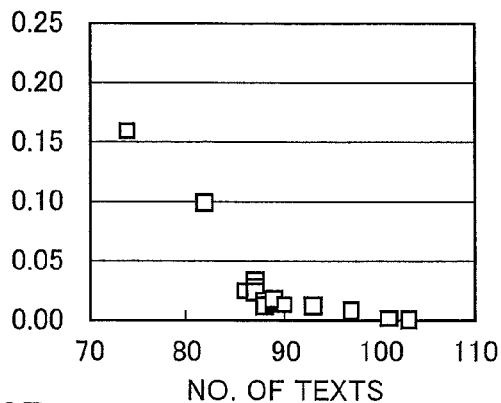
FIG.8B
MAXIMUM ERROR
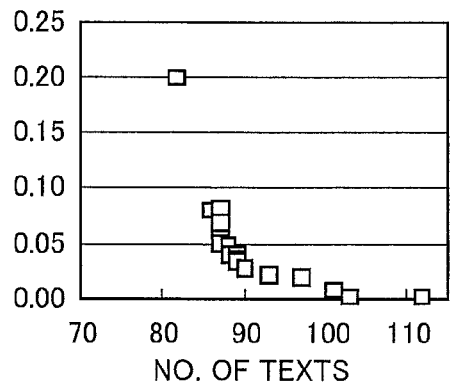
FIG.8C
| COEFFICIENT | NO. OF TEXTS | MAXIMUM | AVERAGE | |
|---|---|---|---|---|
| 1 | 74 | 0.480 | 0.159 | TWO DIGITS |
| 2.5 | 82 | 0.200 | 0.099 | |
| 5 | 86 | 0.080 | 0.025 | |
| 6 | 87 | 0.081 | 0.022 | |
| 7 | 87 | 0.069 | 0.034 | |
| 8 | 87 | 0.055 | 0.028 | |
| 9 | 87 | 0.050 | 0.024 | |
| 10 | 88 | 0.048 | 0.017 | THREE DIGITS |
| 15 | 90 | 0.028 | 0.013 | |
| 25 | 93 | 0.020 | 0.008 | |
| 50 | 101 | 0.008 | 0.001 | FOUR DIGITS |
| 100 | 103 | 0.002 | 0.000 | |
| 250 | 112 | 0.002 | 0.000 | |

FIG.9A
AVERAGE ERROR
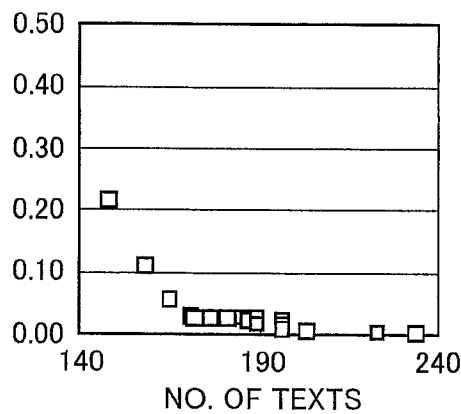
NO. OF TEXTS
FIG.9B
MAXIMUM ERROR
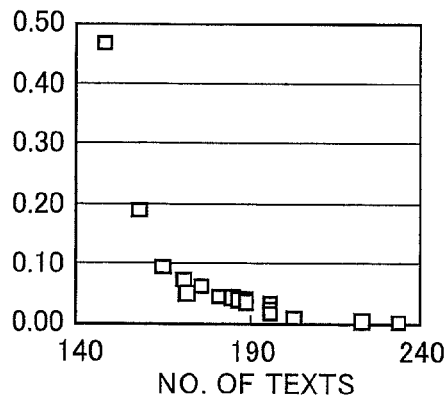
NO. OF TEXTS
FIG.9C
| COEFFICIENT | NO. OF TEXTS | MAXIMUM | AVERAGE | |
|---|---|---|---|---|
| 1 | 148 | 0.467 | 0.217 | TWO DIGITS |
| 2.5 | 158 | 0.189 | 0.110 | |
| 5 | 165 | 0.094 | 0.055 | |
| 6 | 171 | 0.073 | 0.029 | |
| 7 | 172 | 0.049 | 0.024 | THREE DIGITS |
| 8 | 176 | 0.062 | 0.025 | |
| 9 | 181 | 0.045 | 0.024 | |
| 10 | 185 | 0.044 | 0.026 | |
| 15 | 196 | 0.033 | 0.014 | FOUR DIGITS |
| 25 | 196 | 0.016 | 0.008 | |
| 50 | 203 | 0.009 | 0.005 | |
| 100 | 223 | 0.004 | 0.003 | |
| 250 | 234 | 0.002 | 0.001 | |

FIG.10
| STATUS | | IMAGE |
|---|---|---|
| ORIGINAL DOCUMENT | | 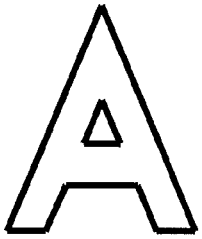 |
| OUTLINE DATA | COEFFICIENT=1<br>NO. OF TEXTS=74 | 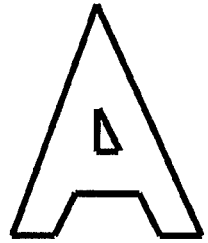 |
| | COEFFICIENT=2.5<br>NO. OF TEXTS=82 | 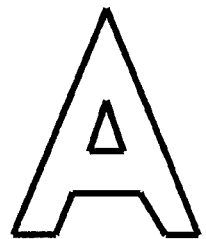 |
| | COEFFICIENT=9<br>NO. OF TEXTS=87 | 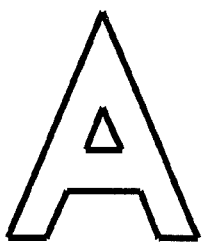 |
| | COEFFICIENT=50<br>NO. OF TEXTS=101 | 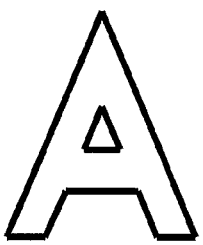 |

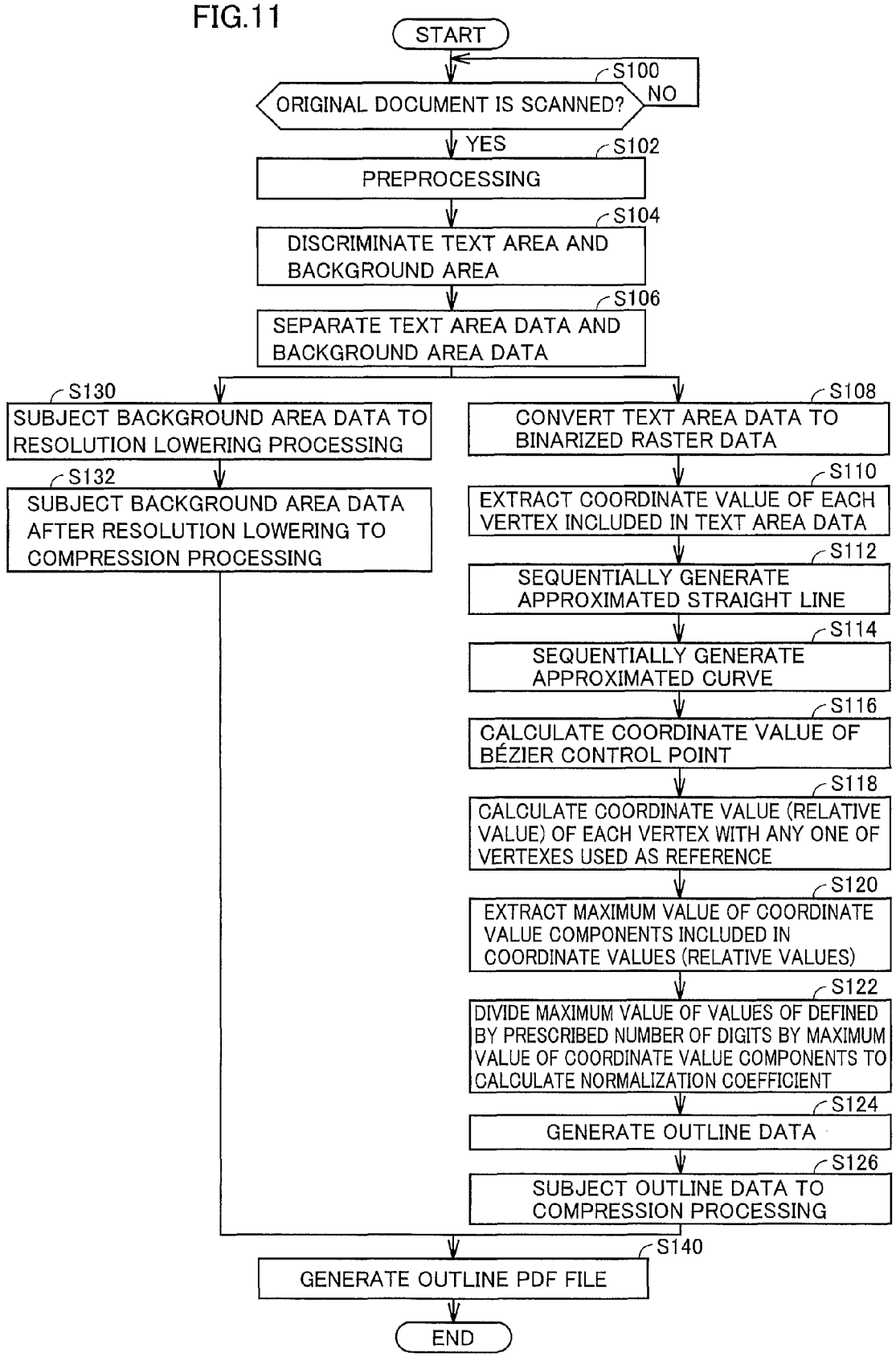

IMAGE PROCESSING APPARATUS DIRECTED TO IMAGE OUTLINE PROCESSING, IMAGE PROCESSING METHOD OF THE SAME, AND COMPUTER-READABLE STORAGE MEDIUM STORING INSTRUCTIONS FOR PERFORMING IMAGE PROCESSING

This application is based on Japanese Patent Application No. 2008-221273 filed with the Japan Patent Office on Aug. 29, 2008, the entire content of which is hereby incorporated by reference.

BACKGROUND OF THE INVENTION

1. Field of the Invention

The present invention relates to an image processing apparatus, an image processing method, and a computer-readable storage medium storing instructions for performing image processing, and particularly relates to outline processing of an image.

2. Description of the Related Art

In recent years, with digitalization of information, a so-called paperless scheme has been advanced, in which a document is stored and/or transmitted and received as electronic data instead of using a paper medium. Meanwhile, with a paper medium printed out from an image forming apparatus, a shift from monochrome to full color has been advanced. Therefore, the need to scan a document printed in full color by a scanner or the like to generate image data, and to store this image data in a hard disk or the like, or transmit the same by attaching to an electronic mail has arises.

However, for example, when a full-color document of A4 size is scanned by a scanner at 300 dpi, raw image data (scanned data) is as large as about 25 MB, so that the file size is too large to be attached to an electronic mail.

Thus, the scanned data needs to be compressed to an appropriate file size. As such compression techniques, various ones have been proposed. For example, a method such as JPEG (Joint Photographic Experts Group) can be used. In the JPEG, quantizing the scanned data on a predetermined block basis causes a quantization error. Since this quantization error increases so much that a compression rate is increased, applying high compression to the scanned data may make characters in the document illegible.

Processing of outlining, in which a shape of a character scanned as the scanned data is handled as a set of functions each passing through a plurality of vertexes, has been put to practical use.

For example, Japanese Laid-Open Patent Publication No. 2006-253892 discloses an image processing method and an image processing apparatus, in which a small character is outlined using a high-resolution binary image, and a large character is outlined using a low-resolution binary image to thereby generate a high-grade outlined image while shortening processing time.

Moreover, Japanese Laid-Open Patent Publication No. 2005-174227 discloses an image processing apparatus capable of generating a high-quality electronic file with its data amount reduced, as an electronic file corresponding to the scanned original image by executing vector data conversion of an original image based on an image size of the original image, and a control method of the same, and a program for the same.

As a specific procedure of the above-described outline processing, a plurality of coordinate values of vertexes defining an object (including a character and the like) included in scanned data are detected, and with any of these coordinate values set as a reference, coordinate values of anchor points and/or coordinate values of Bézier control points for describing a function (Bézier curve) are calculated by arithmetic operation processing. Further, these coordinate values are converted using a specific conversion coefficient and are outputted as outline data. The arithmetic operation result at this time is outputted so as to be of a prescribed number of digits by round-off or the like.

Generally, the quality of the image subjected to the outline processing depends on precision (the number of digits) of each coordinate value, and a numeric value defined by a larger number of digits allows a higher-precision image to be reproduced. On the other hand, in terms of reduction in file size, it is preferable that the number of digits in which each coordinate value is represented be smaller.

As the size of a character included in the image is smaller, a variation amount between extracted coordinate values is smaller. Accordingly, for a document including a character of a smaller size, a higher precision with which such variation between the coordinate values can be represented is required. On the other hand, in a case where the outline processing is performed to a document including a character of a larger size with the precision suitable for the above-mentioned character of the smaller size, there arises a problem in that the file size unnecessarily becomes large.

On the contrary, in a case where the precision is made lower, sufficient image quality (legibility of character) for the document including the character of the smaller size disadvantageously cannot be kept.

SUMMARY OF THE INVENTION

The present invention is achieved in order to solve the above-described difficulties, and an object thereof is to provide an image processing apparatus having an outline processing function enabling conflicting problems of maintaining appropriate image quality of outline data and avoiding unwanted increase in file size to be balanced, and an image processing method of the same and a computer-readable storage medium storing instructions for performing image processing.

An image processing apparatus according to an aspect of the present invention includes a detector for detecting a plurality of coordinate values indicating an outline of an object included in an input image, and a generator for generating outline data based on the plurality of coordinate values detected by the detector. The generator includes a unit for calculating relative coordinate values of the coordinate values detected based on a coordinate value set as a reference, a unit for calculating a normalization coefficient for normalizing the relative coordinate values to values within a numeric value range defined by a prescribed number of digits, and a unit for generating the outline data by multiplying the respective relative coordinate values by the normalization coefficient.

Preferably, the unit for calculating the normalization coefficient includes a unit for extracting a maximum value of coordinate value components included in the relative coordinate values, and a unit for dividing, by the maximum value of the coordinate value components, a maximum value of values defined by the prescribed number of digits.

Preferably, the image processing apparatus further includes a separator for separating the input image into a text area and an area other than the text area, and the detector is adapted to detect the coordinate values from the text area.

More preferably, the image processing apparatus further includes a first compressor for compressing the outline data, a second compressor for compressing an image of the area other than the text area, and a combiner for combining the compressed outline data and the compressed image of the area other than the text area to generate a digitalized document.

Preferably, the image processing apparatus further includes a scanner for generating the input image by scanning an original document of a paper medium.

An image processing method according to another aspect of the present invention includes the steps of detecting a plurality of coordinate values indicating an outline of an object included in an input image, and calculating relative coordinate values of the coordinate values detected based on a coordinate value set as a reference, calculating a normalization coefficient for normalizing the relative coordinate values to values within a numeric value range defined by a prescribed number of digits, and generating outline data by multiplying the respective relative coordinate values by the normalization coefficient.

Preferably, the step of calculating the normalization coefficient includes the steps of extracting a maximum value of coordinate value components included in the relative coordinate values, and dividing, by the maximum value of the coordinate value components, a maximum value of values defined by the prescribed number of digits.

Preferably, the image processing method further includes the step of separating the input image into a text area and an area other than the text area, and the step of detecting the plurality of coordinate values includes the step of detecting the coordinate values from the text area.

More preferably, the image processing method further includes the steps of compressing the outline data, compressing an image of the area other than the text area, and combining the compressed outline data and the compressed image of the area other than the text area to generate a digitalized document.

Preferably, the image processing method further includes the step of generating the input image by scanning an original document of a paper medium.

According to still another aspect of the present invention, there is provided a computer-readable storage medium storing instructions for performing image processing. When the instructions are executed by a processor, the instructions cause the processor to perform the steps of detecting a plurality of coordinate values indicating an outline of an object included in an input image, calculating relative coordinate values of the coordinate values detected based on a coordinate value set as a reference, calculating a normalization coefficient for normalizing the relative coordinate values to values within a numeric value range defined by a prescribed number of digits, and generating outline data by multiplying the respective relative coordinate values by the normalization coefficient.

Preferably, the step of calculating the normalization coefficient includes the steps of extracting a maximum value of coordinate value components included in the relative coordinate values, and dividing, by the maximum value of the coordinate value components, a maximum value of values defined by the prescribed number of digits.

Preferably, the instructions cause the processor to further perform the step of separating the input image into a text area and an area other than the text area, and the step of detecting the plurality of coordinate values includes the step of detecting the coordinate values from the text area.

More preferably, the instructions cause the processor to further perform the steps of compressing the outline data, compressing an image of the area other than the text area, and combining the compressed outline data and the compressed image of the area other than the text area to generate a digitalized document.

Preferably, the instructions cause the processor to further perform the step of generating the input image by scanning an original document of a paper medium.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a functional configuration of a multi function peripheral according to an embodiment of the present invention.

FIG. 2 is a block showing a functional configuration related to image processing in the multi function peripheral according to the present embodiment.

FIG. 6 is a diagram showing a description example of outline data generated based on coordinate values after the normalization shown in FIG. 5.

FIGS. 7A and 7B are diagrams for explaining the outline processing according to the embodiment of the present invention as compared with related outline processing.

FIGS. 8A to 8C are diagrams showing an experiment result from performing the outline processing for a character "A".

FIGS. 9A to 9C are diagrams showing an experiment result from performing the outline processing for a character "B".

FIG. 10 shows an experiment result demonstrating quality of an image obtained by the experiment shown in FIGS. 8A to 8C.

FIG. 11 is a flowchart showing an image processing procedure according to the embodiment of the present invention.

DESCRIPTION OF THE PREFERRED EMBODIMENTS

Figures 3A, 3B, 4, 5:
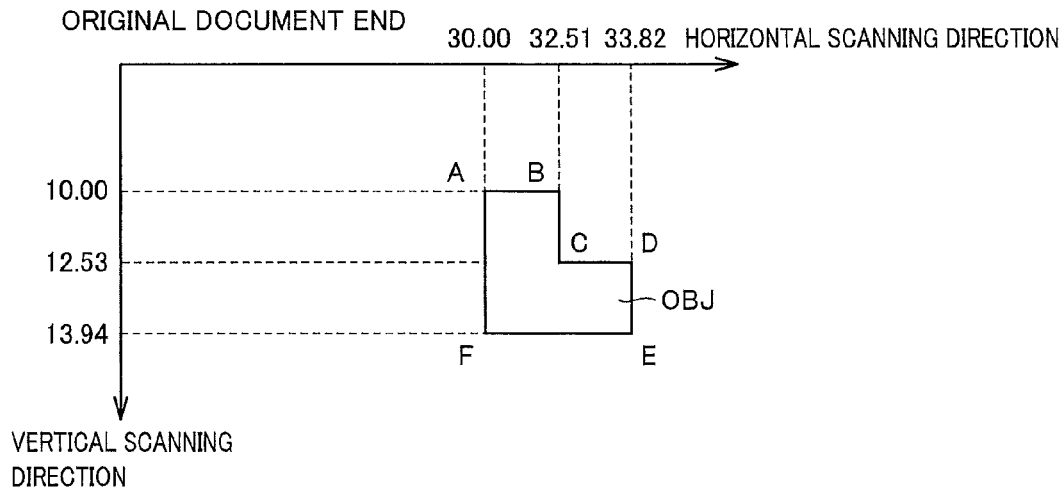
FIGS. 3A and 3B are diagrams illustrating one example of an object to be subjected to outline processing.
FIG. 4 is a diagram showing a result after executing difference processing to coordinate values shown in FIG. 3B.
FIG. 5 is a diagram showing a result after normalizing coordinate values shown in FIG. 4.

Referring to the drawings, embodiments of the present invention will be described in detail. The same or corresponding parts in the figures are given the same reference numerals, and their descriptions are not repeated.

As a representative example of an image processing apparatus according to the present invention, a multi function peripheral (hereinafter, also referred to as MFP) having a scanning function in addition to an image formation function (in monochrome and/or in color) such as a printing function and a copy function is now described.

<Overview>

An MFP 100 according to the present embodiment scans an original document of a paper medium on which a character and/or a chart are represented, and performs outline processing to scanned data (input image) generated by this scanning, More specifically, MFP 100 generates a digitized document (representatively, document data of PDF (Portable Document Format)) from the scanned data. Particularly, MFP 100 separately extracts a text area and a background area other than the text area from the scanned data, and respectively performs image compression in different manners to thereby generate so-called "outline PDF". This outline PDF includes outline data resulting from executing the outline processing to the above-mentioned text area, Details of the generation processing of this outline PDF will be described later.

<Functional Configuration>

FIG. 1 is a block diagram showing a functional configuration of MFP 100 according to the embodiment of the present invention.

Referring to FIG. 1, MFP 100 includes a scanner 10, an input image processor 12, a CPU (Central Processing Unit) 14, a storage 16, a network I/F (Interface) 18, a modem 20, an operation panel 22, an output image processor 24, and a print engine 26, and these units are connected to one another through a bus 28.

Scanner 10 scans image information from an original document to generate scanned data (input image). This scanned data is sent to input image processor 12. More specifically, scanner 10 irradiates light from a light source to the original document placed on a platen glass, and receives light reflected from the original document by image pickup elements arrayed in a main scanning direction, or the like to thereby obtain the image information on the original document. Alternatively, scanner 10 may include a document feeder tray, a delivery roller, a resist roller, a carrier drum, a paper discharge tray, and the like so as to enable successive original document scanning.

Input image processor 12 executes input image processing such as color conversion processing, color correction processing, resolution conversion processing, and area discrimination processing to the scanning data received from scanner 10. Input image processor 12 outputs data after the input image processing to storage 16.

CPU 14 is a processor in charge of overall processing of MFP 100, and representatively, various types of processing described later are performed by executing instructions stored in advance. More specifically, CPU 14 executes detection of an operation key selected on operation panel 22, control over display on operation panel 22, conversion processing of an image format (JPEG, PDF, TIFF (Tagged Image File Format) or the like) of the scanned data, control over communication through a network and/or a telephone line, and the like.

Storage 16 stores the instructions executed in CPU 14 and/or the scanned data outputted from input image processor 12. Representatively, storage 16 includes a volatile memory such as DRAM (Dynamic Random Access Memory), and a nonvolatile memory such as a hard disk drive (HDD) and a flash memory. Moreover, storage 16 stores an outline PDF file generated by the outline processing described later.

Network I/F 18 performs data communication with a server apparatus not shown and the like through a network such as a LAN (Local Area Network). Specifically, network I/F 18 creates an electronic mail to which the outline PDF data generated inside MFP 100 is attached, and transmits the same to the server apparatus.

Modem 20 is connected to the telephone line to perform transmission and reception of FAX data with another MFP and the like. Representatively, modem 20 includes an NCU (Network Control Unit).

Operation panel 22 is a user interface that presents operation information such as an operation menu and a job execution status to a user, and receives a user instruction in accordance with pressing by the user. More specifically, operation panel 22 includes a key input unit as an input unit, and a touch panel as an input unit configured integrally with a display. The key input unit includes ten keys and keys to which respective functions are assigned, and outputs commands corresponding to the key pressed by the user to CPU 14. The touch panel is made up of a liquid crystal panel and a touch operation detector provided on the liquid crystal panel, visually displays various types of information to the user, and upon detecting a touch operation by the user, outputs commands corresponding to the touch operation to CPU 14.

Output image processor 24 executes output image processing such as screen control, smoothing processing, and PWM (Pulse Width Modulation) control to the scanned data when the scanned data is printed out. Output image processor 24 outputs image data after the output image processing to print engine 26.

Print engine 26 prints (or forms) the image on paper based on the image data received from output image processor 24. Representatively, print engine 26 is made of an electrophotographic image formation unit. More specifically, print engine 26 includes an imaging unit made up of a photoreceptor drum, an exposure unit, a developing unit and the like, and additionally, a transfer belt, a fixing device, a paper feeder, a paper discharger and the like. For example, print engine 26 configured to perform full-color printing would include four color imaging units for yellow (Y), magenta (M), cyan (C), and black (K), respectively.

<Overall Processing>

FIG. 2 is a block diagram showing a functional configuration related to the image processing in MFP 100 according to the present embodiment. In the image processing according to the present embodiment, an original document is scanned by scanner 10, and outline PDF data is generated based on this scanned image information.

Referring to FIG. 2, input image processor 12 includes a preprocessor 52 and an area discriminating/separating unit 54 as functions thereof. Moreover, CPU 14 provides a resolution lowering unit 56, an outline processor 58, a lossless compressor 60, a non-lossless compressor 62, and a combiner 64 as functions thereof.

Scanner 10 scans an original document of a paper medium to generate scanned data (or input image) to output the scanned data to input image processor 12. As the scanned data, raster data in a bitmap format or the like may be employed or another image format such as a TIFF format and a JPEG format may be employed.

In input image processor 12, preprocessor 52 executes preprocessing including conversion of the image format, resolution conversion and foundation removal, to the scanned data received from scanner 10. Furthermore, area discriminating/separating unit 54 analyzes the image data processed by preprocessor 52 to discriminate a text area and a background area other than the text area. Area discriminating/separating unit 54 outputs text area data corresponding to the text area in the image data received from preprocessor 52 to outline processor 58, and outputs background area data corresponding to the background area to resolution lowering unit 56. For the discrimination between the text area and the background area, any known technique can be used. As examples of the known technique, there are a methodology of binarizing the scanned data and performing discrimination based on density variation thereof, and a methodology of performing the discrimination based on a histogram of brightness.

Outline processor 58 executes the outline processing according to the present embodiment to the text area data received from area discriminating/separating unit 54 to generate outline data. More specifically, outline processor 58 includes a vertex detector 581, a straight-line approximation unit 582, a Bézier approximation unit 583, and a precision determining unit 584. Processing in each of these units will be described later.

Lossless compressor 60 performs compression processing to the outline data received from outline processor 58. Representatively, lossless compressor 60 uses, as a compression methodology suitable for the outline data (i.e., text-based data), FLATE compression which is a lossless compression methodology.

Resolution lowering unit 56 executes resolution lowering processing to the background area data received from area discriminating/separating unit 54. For example, if the background area data is of 300 dpi, resolution conversion to change this resolution to 150 dpi is performed. This is because an image quality of the background area is not required as high as that of the above-described text area, and reduction in file size is thus given priority. The background area data subjected to resolution lowering in resolution lowering unit 56 is outputted to non-lossless compression 62.

Non-lossless compression unit 62 performs compression processing to the background area data subjected to the resolution lowering, which is received from resolution lowering unit 56. Representatively, non-lossless compressor 62 uses, as a compression methodology suitable for the background area data (i.e., image data), JPEG compression which is a non-lossless compression.

Combiner 64 hierarchically combines the outline data compressed by lossless compressor 60, and the background area data compressed by non-lossless compressor 62 to generate an outline PDF file, which is a digitalized document. This outline PDF is made up of information on a character outlined with appropriate image quality, and information on the background area whose file size is reduced. This can maintain the appropriate image quality of the necessary character information and restrain unwanted increase in file size.

<Outline Processing>

Next, the outline processing according to the present embodiment is described.

Referring to FIG. 2, vertex detector 581 converts the text area data received from area discriminating/separating unit 54 to binarized raster data as needed, and extracts a plurality of vertexes of each object (representatively, character) from this binarized raster data to output a coordinate value of each of the vertexes. These detected vertexes correspond to coordinate values indicating an outline of the object included in the scanned data (input image). As a methodology for detecting each of the vertexes for this object, so-called edge detection processing can be used.

Straight-line approximation unit 582 sequentially generates an approximated straight line passing through two or more adjacent vertexes based on the plurality of vertexes detected by vertex detector 581. Furthermore, Bézier approximation unit 583 performs Bézier approximation to generate an approximated curve while correcting the approximated straight line generated in straight-line approximation unit 582. More specifically, Bézier approximation unit 583 calculates a coordinate value of a Bézier control point for specifying the approximated curve. The Bézier approximation is known technique, and a detail description thereof is not given. Namely, straight-line approximation unit 582 and Bézier approximation unit 583 determine a function that defines a relationship between the vertexes detected by vertex detector 581.

Precision determining unit 584 determines a normalization coefficient (precision) for normalizing the coordinate value of each of the vertexes detected in vertex detector 581, the coordinate value of the Bézier control point and the like, to a value defined by a prescribed number of digits. This normalization coefficient is for normalizing (adapting) the extracted coordinate value to a value within a numeric value range defined by the prescribed number of digits. Precision determining unit 584 normalizes the respective coordinate values based on the determined normalization coefficient to generate outline data based on the coordinate values after normalization.

The prescribed number of digits is determined based on limitation in file size of the outline data (or outline PDF data), and may be set as a default value in advance, or may be arbitrarily set by a user. In the latter case, the user may dispose the original document on scanner 10, and then select the file size among items of "large", "medium", "small", and the like, before giving a scanning start instruction.

Next, referring to FIGS. 3A, 3B and 4 to 6, a specific example of processing in outline processor 58 is illustrated.

FIGS. 3A and 3B illustrates one example of an object OBJ to be subjected to the outline processing. FIG. 4 shows a result after difference processing to coordinate values shown in FIG. 3B. FIG. 5 shows a result after coordinate values shown in FIG. 4 are normalized.

Referring to FIG. 3A, for example, when text area data including object OBJ that is defined as a rectangular in a two-dimensional coordinate of a horizontal scanning direction and a vertical scanning direction is inputted into vertex detector 581 (FIG. 2), vertex detector 581 detects coordinate values of vertexes A to F. One example of these detected values is shown in FIG. 3B. Namely, vertex detector 581 detects coordinate A (30.00, 10.00), coordinate B (32.51, 10.00), coordinate C (32.51, 12.53), coordinate D (33.82, 12.53), coordinate E (33.82, 13.94), and coordinate F (30.00, 13.94). A minimum unit of detection precision of vertex detector 581 is "0.01 cm".

For the coordinate values of the respective vertexes of object OBJ detected in this manner, straight-line approximation unit 582 (FIG. 2) and Bézier approximation unit 583 (FIG. 2) determine a function defining a relationship between the vertexes.

Precision determining unit 584 (FIG. 2) then represents the coordinates of the detected vertexes of object OBJ relative to a coordinate value set as a reference. Preferably, any one of the detected vertexes of object OBJ is set as the reference. Namely, precision determining unit 584 calculates differences between the reference vertex (vertex A in the case of FIG. 3A) and the respective other vertexes. As a result, as shown in FIG. 4, relative coordinate values of the other vertexes with the coordinate value of vertex A set as (0, 0) are calculated.

The reference may be any coordinate value of a position relative to each of the vertexes of object OBJ, and may use any point on sides of object OBJ, any point in an internal area of object OBJ, any point close to object OBJ, or the like.

Furthermore, precision determining unit 584 determines a normalization efficient (precision) so that any coordinate value component included in the relative coordinate values shown in FIG. 4 is within a numeric value range defined by the prescribed number of digits (e.g., in the case of two digits, "99" or less). More specifically, precision determining unit 584 calculates the normalization coefficient so that a maximum of the coordinate value components shown in FIG. 4 does not exceed, and substantially coincides with a maximum value of values defined by the relevant prescribed number of digits.

For example, in the example shown in FIG. 4, the maximum value of the respective coordinate components is "3.94" which is a vertical scanning direction component of coordinates E and F. Precision determining unit 584 divides "99", which is the maximum value of values defined by two digits, by the maximum value of the coordinate components "3.94". This division result is "25.2", and the numeral below the decimal point is rounded down to limit the normalization coefficient to that of two digits as well, thereby resulting in "25" as the normalization coefficient. Furthermore, precision determining unit 584 multiplies the respective coordinate components shown in FIG. 4 by this normalization coefficient "25", and rounds down numerals below the decimal point to thereby normalize the coordinate values shown in FIG. 4 to the range of two digits (0-99). The coordinate values normalized in this manner are shown in FIG. 5.

As shown in FIG. 5, it can be seen that the values of the coordinate components of coordinates A to F are normalized to the range of 0 to 99. In this manner, in the outline processing according to the present embodiment, the appropriate normalization coefficient is dynamically determined in accordance with the group of the coordinate values of differences as shown in FIG. 4, and using this, the coordinate values are normalized to values defined by the prescribed number of digits. This can increase the image quality (legibility of the character) of the outline data up to the maximum reproducible level within the prescribed number of digits.

While in the above description, a configuration in which the common normalization coefficient is used for the coordinate components of the horizontal scanning direction and the vertical scanning direction, a normalization coefficient in the horizontal scanning direction and a normalization coefficient in the vertical scanning direction may be provided independently from each other. In this case, in the example shown in FIG. 4, the normalization coefficient in the horizontal scanning direction may be "26", and the normalization coefficient in the vertical scanning direction may be "25".

FIG. 6 shows a description example of the outline data generated based on the coordinate values after the normalization shown in FIG. 5. For simplification, header information and the like are not described in the description example shown in FIG. 6.

Referring to FIG. 6, the outline data includes a row 202 that describes a scale indicating the normalization coefficient. This row 202 defines the scale indicating the normalization coefficient, that is, an inverse number of the normalization coefficient (1/25=0.04 cm). When image data is generated from this outline data, the coordinate values of the original text area data are calculated by multiplying the respective coordinate values after the normalization by this scale.

Moreover, the outline data includes a row 204 in which the coordinate indicating the reference vertex (in this example, vertex A). That is, in row 204, there is a description of "30 10 cm", which indicates that the normalized coordinate value of vertex A is "30, 10".

Furthermore, the outline data includes rows 211 to 217 in which the coordinate values of vertexes A to E are described respectively. For example, in row 211, there is a description of "0 0 1", which means that straight-line approximation should be performed from the coordinate value (0, 0) to a coordinate value (63, 0) described in next row 212.

As processing in generating image data with respect to these rows 211 to 217, for example, with row 211, the coordinate value (30, 10) of the reference vertex is added to the coordinate value (0, 0) described in the relevant row as an offset, so that the coordinate value (30, 10) is calculated as an absolute coordinate. Moreover, with row 212, the coordinate value (30, 10) of the reference vertex is added to the coordinate value (63, 0) described in the relevant row as an offset, so that a coordinate value (93, 10) is calculated as an absolute coordinate value. Hereinafter, similar processing is executed for rows 213 to 217. Furthermore, each component of the absolute coordinate values calculated from respective rows 213 to 217 is multiplied by the scale (0.04) described in row 202, respectively, by which reproduction is made as information on object OBJ in the original document.

While in the above description, object OBJ that can be represented by the straight-line approximation is described, for object OBJ including a curve, outline data is generated in a similar procedure using the Bézier approximation or the like.

<Comparison with Related Outline Processing>

FIGS. 7A and 7B are diagrams for explaining the outline processing according to the embodiment of the present invention in comparison with related outline processing. FIG. 7A shows an overview of the outline processing related to the present invention, and FIG. 7B shows an overview of the outline processing according the present embodiment.

As shown in FIG. 7A, in the outline processing related to the present invention, a coefficient $\alpha$ corresponding to the normalization coefficient in use for the outline processing according to the above-described present embodiment is fixed. Namely, values obtained by uniformly multiplying the coordinate values by coefficient $\alpha$ are outputted as the outline data without depending on a variation amount between the coordinate values (corresponding to the maximum value of the coordinate value components shown in FIG. 4).

Therefore, as shown in FIG. 7A, even though with a character 1, a range in which the coordinate values can be represented in the prescribed number of digits (dynamic range) can be utilized sufficiently, with a character 2 whose variation amount between coordinate values thereof is smaller than that of character 1, the dynamic range cannot be utilized sufficiently. That is, fixing the coefficient in converting the coordinate values to the outline data may cause the image quality of the outline data and the file size to be affected by the size of the character subjected to the outline processing and the like, thereby being degraded.

Moreover, with a character whose variation amount between coordinate values is larger than that of character 1, which is not shown, will require a larger number of digits, thereby increasing the file size.

In contrast, as shown in FIG. 7B, in the outline processing according to the present embodiment, the normalization coefficient is dynamically determined, in accordance with the variation amount between the coordinate values (maximum value of the coordinate value components shown in FIG. 4), such that the values outputted as the outline data substantially coincide with the maximum value of values defined by the prescribed number of digits. Such determination can constantly enhance the image quality (legibility of the character) of the outline data up to the substantially highest value under conditions of the prescribed number of digits as well as being free of the influence of the size of the character subjected to the outline processing. In other words, there can be provided maximum feasible image quality under limitation in the number of digits, which is set from the limit of the file size.

Experimental Examples

In order to verify effects in the outline processing according to the present embodiment, experiments were conducted for relationship between the image quality and the file size when the outline processing was performed with regard to various normalization coefficients for a plurality of characters.

FIGS. 8A to 8C show an experiment result from performing the outline processing to a character "A". FIGS. 9A to 9C show an experiment result from performing the outline processing to a character "B".

As specific experiment details, the outline processing was respectively performed in cases where the normalization coefficients were set in thirteen different ways between 1 and 250 for a scanner image obtained from an original document on which each of the characters ("A" and "B") was printed. Furthermore, errors between coordinates of respective vertexes described in each of the outline data and original coordinate values (maximum value and average value) were evaluated. A number of texts (corresponding to the file size) of each of the outline data was evaluated. This number of texts means the number of characters described in each of the outline data.

The present experiments were to verify the effects of the outline processing according to the present embodiment, and the above-described processing for dynamically changing the normalization coefficient was not conducted.

In FIG. 8A, a relationship between the number of texts and the average error with respect to character "A" is shown, FIG. 8B shows a relationship between the number of texts and the maximum error with respect to character "A", and FIG. 8C shows a list of experiment results. A hatching area of FIG. 8C indicates a normalization coefficient determined by the outline processing according to the present embodiment.

It can be seen that as shown in FIG. 8A and FIG. 8B, in general, while the file size (the number of texts) and the image quality (average error/maximum error) bears a relationship of trade-off, there are change points where the image quality drastically changes. Namely, the image quality drastically changes (1) in the vicinity of the number of texts of 87 or 88, and in the vicinity of the number of texts of 100. As shown in FIG. 8C, these change points correspond to a point where the coordinate values of the respective vertexes (including anchor points and Bézier control points) change from two digits to three digits, and a point where the coordinate values of the respective vertexes change from three digits to four digits.

As shown in FIGS. 8A and 8B, it can be seen that in regions immediately before the number of digits of the coordinate values described in the outline data is carried, the image quality can be enhanced most efficiently.

On the other hand, it can be seen that according to the outline processing of the present embodiment, the normalization coefficient for character "A" shown in FIGS. 8A and 8B is "9", and that as shown in FIG. 8C, a most efficient value immediately before the coordinate values change from two digits to three digits is selected.

Similarly, FIG. 9A shows a relationship between the number of texts and the average error with respect to character "B", FIG. 9B shows a relationship between the number of texts and the maximum error with respect to character "B", and FIG. 9C shows a list of experiment results.

These FIGS. 9A to 9C also exhibit a similar tendency to that of FIGS. 8A and 8C, and it can be seen that according to the outline processing according to the present embodiment, in this case, a most efficient normalization coefficient is also selected.

FIG. 10 shows an experiment result demonstrating quality of images obtained by the experiments shown in FIGS. 8A to 8C. FIG. 10 shows outline images obtained by the generated outline data in four cases of the normalization coefficient=1, 2.5, 9, and 50.

Referring to FIG. 10, it can be seen that as the normalization coefficient becomes larger, the outline image obtained from the outline data becomes closer to an image printed on the original document. However, while there is not much difference in image quality between an outline image obtained in the case of the normalization coefficient="9", and an outline image obtained in the case of the normalization coefficient="50", the case of the normalization coefficient="9" (value determined by the outline processing according to the present embodiment), whose text size is smaller, is more excellent in reduction in file size.

As described above, according to the outline processing according to the present embodiment, conflicting problems of maintaining appropriate image quality of the outline data and avoiding of unwanted increase in file size can be balanced.

<Processing Procedure>

The above-described procedure of the outline processing according to the present embodiment is comprehensively illustrated as follows.

FIG. 11 is a flowchart showing the image processing procedure according to the embodiment of the present invention.

Referring to FIG. 11, input image processor 12 (FIG. 1) determines whether or not any original document is scanned by scanner 10 (FIG. 1) (step S100). When no original document is scanned by scanner 100 (in a case of NO in step S100), the processing returns to step S100.

When any original document is scanned by scanner 10 (in a case of YES in step S100), input image processor 12 executes preprocessing including conversion of the image format, resolution conversion, foundation removal to scanned data generated by the scanning (step S102). Furthermore, input image processor 12 analyzes image data after the preprocessing to discriminate a text area and a background area other than the text area (step S104), and to separate text area data corresponding to the text area and background area data corresponding to the background area in the image data after the preprocessing (step S106).

Subsequently, CPU 14 (FIG. 1) converts the text area data to binarized raster data (step S108), and detects vertexes of each character from this binarized raster data to thereby extract coordinate values of the respective vertexes included in the text area data (step S110).

Furthermore, CPU 14 sequentially generates an approximated straight line passing through the adjacent two or more vertexes based on the coordinate values of the extracted plurality of vertexes (step S112). Subsequently, CPU 14 sequentially generates an approximated curve by performing Bézier approximation while correcting the approximated straight line generated in step S112 (step S114), and calculates a coordinate value of a Bézier control point for specifying each of the approximated curves (step S116).

Subsequently, CPU 14, with any one of the vertexes obtained by the processing in step S110 to S116 (including anchor points and Bézier control points) used as a reference, calculates coordinate values (relative values) of the other vertexes (step S118). CPU 14 extracts a maximum value of the coordinate value components included in the coordinate values (relative values) of the respective vertexes (step S120), and divides a maximum value of values defined by a prescribed number of digits set in advance, by the extracted maximum value of the coordinate value components, to thereby calculate a normalization coefficient (step S122). Furthermore, CPU 14 multiplies the coordinate values (relative values) of the respective vertexes calculated in step S118 by the normalization coefficient calculated in step S122 to generate outline data (step S124), and performs compression processing to this generated outline data (step S126).

In parallel with the processing in steps S108 to S126, CPU 14 executes resolution lowering processing to the background area data (step S130) and further performs the compression processing to the background area data subjected to the resolution lowering (step S132).

Finally, CPU 14 hierarchically combines the outline data compressed in step S126 and the background area data compressed in step S132 to generate an outline PDF file (step S140).

Effects of the Embodiment

According to the embodiment of the present invention, a normalization coefficient for normalizing a plurality of coordinate values indicating a target object to values within a numeric value range, defined by a prescribed number of digits set from the limit of the file size is dynamically determined. Since this normalization coefficient is determined so as to make the most efficient use of the range (dynamic range) in which the coordinate values can be represented in the prescribed number of digits, the image quality (legibility of a character) of outline data can be enhanced up to the highest level under conditions of the prescribed number of digits.

As a result, the conflicting problems of maintaining the appropriate image quality of the outline data and avoiding unwanted increase in file size can be balanced.

Other Embodiments

While in the above-described embodiment, as a representative example of the image processing apparatus according to the present invention, MFP 100 has been illustrated, the image processing apparatus according to the present invention may be implemented by a personal computer connected to a scanner. In this case, installing an image processing program according to the present invention in the personal computer allows the personal computer to serve as the image processing apparatus according to the present invention.

Namely, the above-mentioned image processing program is delivered and/or distributed as a computer-readable storage medium that stores instructions for performing the above-described image processing. A processor such as a CPU included in the computer executes the instructions stored in the computer-readable storage medium, by which the instructions cause the processor to execute all or a part of the steps providing the above-described image processing. As the computer-readable storage medium, typically, a DVD (Digital Versatile Disk), CD-ROM (Compact Disk-Read Only Memory), flash memory, mask ROM and the like are cited.

Furthermore, the image processing program according to the present invention may also load necessary modules in a predetermined sequence and at predetermined timing among program modules provided as a part of the operating system so as to execute the processing related to the loaded modules. In this case, the above-described modules may not be included in the program itself, but the processing may be executed in cooperation with the operating system. The program not including the above-described modules can also be included by the program according to the present invention.

The image processing program according to the present invention may also be provided by being incorporated in a part of another program. Also, in this case, the modules included in the above-described another program are not included in the program itself, but the processing is executed in cooperation with the other program. The above-described program incorporated in the other program can also be included by the program according to the present invention.

A provided program product is installed in a program storage such as a hard disk to be executed. The program product includes the program itself, and a storage medium in which the program is stored.

Furthermore, some or all of the functions implemented by the image processing program according to the present invention may be configured by dedicated hardware.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus comprising:
  a detector for detecting a plurality of coordinate values indicating an outline of an object included in an input image; and
  a generator for generating outline data based on the plurality of coordinate values detected by said detector,
  said generator including:
    a unit for calculating relative coordinate values of the coordinate values detected based on a coordinate value set as a reference;
    a unit for calculating a normalization coefficient for normalizing said relative coordinate values to values within a numeric value range defined by a prescribed number of digits; and
    a unit for generating the outline data by multiplying the respective relative coordinate values by said normalization coefficient.

2. The image processing apparatus according to claim 1, wherein
  the unit for calculating said normalization coefficient includes:
    a unit for extracting a maximum value of coordinate value components included in said relative coordinate values; and
    a unit for dividing by the maximum value of the coordinate value components, a maximum value of values defined by said prescribed number of digits.

3. The image processing apparatus according to claim 1, further comprising
  a separator for separating said input image into a text area and an area other than said text area, wherein
  said detector is adapted to detect said coordinate values from said text area.

4. The image processing apparatus according to claim 3, further comprising
  a first compressor for compressing said outline data;
  a second compressor for compressing an image of the area other than said text area; and
  a combiner for combining the compressed outline data and the compressed image of the area other than said text area to generate a digitalized document.

5. The image processing apparatus according to claim 1, further comprising
  a scanner for generating said input image by scanning an original document of a paper medium.

6. An image processing method comprising the steps of:
  detecting, by a processing device, a plurality of coordinate values indicating an outline of an object included in an input image; and
  calculating relative coordinate values of the coordinate values detected based on a coordinate value set as a reference;

calculating a normalization coefficient for normalizing said relative coordinate values to values within a numeric value range defined by a prescribed number of digits; and generating outline data by multiplying the respective relative coordinate values by said normalization coefficient.

7. The image processing method according to claim 6, wherein the step of calculating said normalization coefficient includes the steps of:

extracting a maximum value of coordinate value components included in said relative coordinate values; and dividing, by the maximum value of said coordinate value components, a maximum value of values defined by said prescribed number of digits.

8. The image processing method according to claim 6, further comprising the step of separating said input image into a text area and an area other than said text area, wherein the step of detecting said plurality of coordinate values includes the step of detecting said coordinate values from said text area.

9. The image processing method according to claim 8, further comprising the steps of:

compressing said outline data;

compressing an image of the area other than said text area; and combining the compressed outline data and the compressed image of the area other than said text area to generate a digitalized document.

10. The image processing method according to claim 6, further comprising the step of generating said input image by scanning an original document of a paper medium.

11. A non-transitory computer-readable storage medium storing computer executable instructions to perform the steps of:

detecting a plurality of coordinate values indicating an outline of an object included in an input image;

calculating relative coordinate values of the coordinate values detected based on a coordinate value set as a reference;

calculating a normalization coefficient for normalizing said relative coordinate values to values within a numeric value range defined by a prescribed number of digits; and generating outline data by multiplying the respective relative coordinate values by said normalization coefficient.

12. The computer-readable storage medium according to claim 11, wherein the step of calculating said normalization coefficient includes the steps of:

extracting a maximum value of coordinate value components included in said relative coordinate values; and dividing, by the maximum value of said coordinate value components, a maximum value of values defined by said prescribed number of digits.

13. The computer-readable storage medium according to claim 11, wherein said instructions cause said processor to further perform the step of separating said input image into a text area and an area other than said text area, and the step of detecting said plurality of coordinate values includes the step of detecting said coordinate values from said text area.

14. The computer-readable storage medium according to claim 13, wherein said instructions cause said processor to further perform the steps of:

compressing said outline data;

compressing an image of the area other than said text area; and combining the compressed outline data and the compressed image of the area other than said text area to generate a digitalized document.

15. The computer-readable storage medium according to claim 11, wherein said instructions cause said processor to further perform the step of generating said input image by scanning an original document of a paper medium.

\* \* \* \* \*